United States Patent
Mobin et al.

(10) Patent No.: US 6,826,719 B2
(45) Date of Patent: Nov. 30, 2004

(54) CELLULAR CDMA TRANSMISSION SYSTEM

(75) Inventors: Mohammad S. Mobin, Whitehall, PA (US); Himanshu M. Thaker, Summit, NJ (US); Charles A. Webb, III, Rumson, NJ (US); Lesley J. Wu, Parsippany, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 10/681,655

(22) Filed: Oct. 8, 2003

(65) Prior Publication Data

US 2004/0083411 A1 Apr. 29, 2004

Related U.S. Application Data

(62) Division of application No. 09/707,145, filed on Nov. 6, 2000, now Pat. No. 6,665,825.

(51) Int. Cl.[7] .............................................. G06F 11/00
(52) U.S. Cl. ...................................... 714/707; 714/798
(58) Field of Search ................................ 370/209, 332, 370/468, 335, 18, 208, 235, 441; 704/230, 226; 375/200; 714/707, 798

(56) References Cited

U.S. PATENT DOCUMENTS

| | | | |
|---|---|---|---|
| 5,103,459 A | 4/1992 | Gilhousen et al. ........ 370/209 |
| 5,550,809 A | * 8/1996 | Bottomley et al. ........ 370/342 |
| 5,619,492 A | * 4/1997 | Press et al. .............. 370/441 |
| 5,950,156 A | 9/1999 | Ueno et al. ............... 704/230 |
| 6,061,649 A | 5/2000 | Oikawa et al. ............ 704/226 |
| 6,163,524 A | * 12/2000 | Magnusson et al. ....... 370/208 |
| 6,185,246 B1 | 2/2001 | Gilhousen ................. 375/200 |
| 6,304,561 B1 | 10/2001 | Jin et al. .................. 370/332 |
| 6,307,839 B1 | * 10/2001 | Gerszberg et al. ......... 370/235 |
| 6,366,588 B1 | 4/2002 | Gans et al. ................ 370/468 |
| 6,452,913 B1 | 9/2002 | Proctor, Jr. ............... 370/335 |

* cited by examiner

*Primary Examiner*—David Ton
(74) *Attorney, Agent, or Firm*—Duane Morris LLP

(57) ABSTRACT

A telecommunications system and method which includes a transmitter, a first code generator for generating a noise code and a second code generator for generating a string-based code, wherein data which is transmitted by the transmitter is coded by the first and second code generators before transmission. One of the code generators preferably comprises a pseudorandom noise generator, and the other code generator preferably comprises a cyclic redundancy checking coder for assisting in deskewing of data. The telecommunications system allows the transmitter to dynamically request additional bandwidth from the telecommunications provider in order to efficiently transmit data. The present telecommunications system also substantially reduces skew experienced between the transmitter and the receiver.

7 Claims, 5 Drawing Sheets

CELLULAR CDMA TRANSMISSION SYSTEM

RELATED APPLICATIONS

The present invention is a Divisional application of U.S. application Ser. No. 09/707,145, filed on Nov. 6, 2000, now U.S. Pat. No. 6,665,825, which is related to commonly-assigned U.S. patent application Ser. No. 09/460,165, now U.S. Pat. No. 6,675,327, Ser. No. 09/459,848, now U.S. Pat. No. 6,678,842, Ser. No. 09/459,831, now pending, Ser. No. 09/459,439, now pending, all filed on Dec. 13, 1999.

FIELD OF THE INVENTION

The present invention relates to methods and apparatus for offering wireless telecommunications service, and more specifically, to methods and apparatus for offering wireless telecommunications service using Code Division Multiple Access (CDMA) radio signals.

DESCRIPTION OF THE RELATED ART

Digital communications are widely used for the transmission of voice, data and video information. Such transmission can extend over large geographical distances, between components within a personal computer, or between adjacent circuit portions on an integrated circuit. Certain such communications applications benefit from or require the conversion of serial data into parallel data for simultaneous transmission over parallel communications channels. At the receiving end, the parallel data are desirably converted back into the serial data, and with the bits or symbols in the correct order to avoid data errors.

Unfortunately, the demand for greater data transmission volumes at ever higher speeds may result in skew at the receiver. In other words, the parallel communications channels may introduce different delays to the parallel symbol strings they carry. Because of skew, the parallel symbol strings at the receiver can then no longer be simply reassembled into the starting data.

The skew problem with parallel communications channels has been addressed in a number of ways. For example, U.S. Pat. No. 4,677,618 to Haas et al. recognized the dispersion introduced by wavelength division multiplexed communications channels over optical fiber. This patent discloses determining the relative delays between the channels based upon detecting two bits in a given byte of data. The relative times of arrival of the remaining bits in a byte are predetermined using the relative delay between the two detected bits and the known frequency-related dispersion characteristics of the transmission medium. Certain bits in each received byte may then be delayed using clock delay lines or registers, thereby accounting for skew.

Along similar lines, U.S. Pat. No. 5,157,530 to Loeb et al. also determines and accounts for skew imparted by dispersion in fiber optic wavelength division multiplexing. Relative delays are used to control adjustable delay devices in each channel.

U.S. Pat. No. 5,408,473 to Hutchinson et al. is directed to a technique for synchronizing run-length-limited data transmitted over parallel communications channels. Block boundary synchronization is established during connection initialization by using a property of a required HALT code to detect block boundaries received in each channel. Skew compensation is effected by comparing the times of detection of the block boundaries in the two channels, and appropriately controlling a variable delay in at least one of the channels. If there is a subsequent loss of synchronization, detected transmission errors will eventually result in connection reinitialization and reestablishment of synchronization. Unfortunately, the transmission of the fixed HALT code to detect boundaries may result in false boundary detection. Moreover, since synchronization is not continuously maintained, the technique may be impractical for higher data rates.

U.S. Pat. No. 5,793,770 to St. John et al. is directed to a high-performance parallel interface (HIPPI) to a synchronous optical network (SONET) gateway, and wherein electronic logic circuitry formats data and overhead signals into a data frame for transmission over a fiber optic channel. Stripe skew adjustment is based upon SONET framing, and, as such, the circuitry is relatively complicated, comprising as many as 20,000 logic gates, for example.

The difficulty with skew caused by parallel communications channels is also an important issue to be addressed in communications channels between integrated circuit devices. For example, higher transmission speeds increase the sensitivity to skew, as there is a smaller time window to correctly identify a received bit and have it properly align with bits received on the other parallel communications channels. To provide a higher aggregate transmission rate, the number of parallel communications channels can be increased, without increasing the speed of any given communications channel. However, this may result in significant costs for the additional communications channels. Moreover, for communications between integrated circuits (ICs), increasing the number of communications channels increases the number of pins needed for connecting to the IC. The number of pins and additional packaging complexity may significantly increase the costs of such approaches.

For communications channels between physical layer devices (PLDs) or physical air (PHY) devices, and logical link devices (LLDs), typical interfaces are asymmetrical and the devices are operated in a push-pull configuration. Because of the asymmetry, relatively expensive memory is required on the PLD since it is polled by the LLD, such as an asynchronous transfer mode (ATM) device. Further developments and improvements in the communications interface between a PLD and LLD are also hampered by the skew difficulty described above as a result of higher bit rates over limited parallel communications channels.

Another difficulty associated with conventional communications systems is that as the transmission rates increase, the costs of the transmission medium-to-electrical converters and vice-versa may become prohibitive. This may be especially so for fiber optic based communications systems. Moreover, skew has in the past limited using lower speed electronics to define a relatively large aggregate transmission rate over multiple parallel communications channels.

Code Division Multiple Access (CDMA) is becoming the popular arrangement for offering cellular communications because of its highly efficient use of the radio spectrum. With CDMA each conversation is spread over a large spectrum and individually decoded in such a way that other conversations occupying the same radio spectrum space do not interfere. Because no fixed unique portion of the spectrum is allocated to any one conversation, the speech signals for CDMA need only be sent when the customers are actually talking and are sent as efficiently coded digital speech packets. However, CDMA systems also experience skew problems due to the individual communication channels.

Therefore, there is currently a need for a device and method for reducing or eliminating skew in CDMA telecommunications systems.

SUMMARY OF THE INVENTION

The present invention is telecommunications system and method which includes a transmitter, a first code generator for generating a noise code and a second code generator for generating a string-based code, wherein data which is transmitted by the transmitter is coded by the first and second code generators before transmission.

The above and other advantages and features of the present invention will be better understood from the following detailed description of the preferred embodiments of the invention which is provided in connection with the accompanying drawings.

DETAILED DESCRIPTION

The purpose of the present invention is to allow dynamic bandwidth allocation between a mobile communications unit (e.g., cellular phone, Personal Digital Assistant (PDA), etc.) and a communications base station (e.g., cellular base station, satellite, etc.). The present invention also substantially reduces skew experienced between the mobile communications unit and an additional mobile communications unit (e.g., receiving cellular phone).

Figure 1:
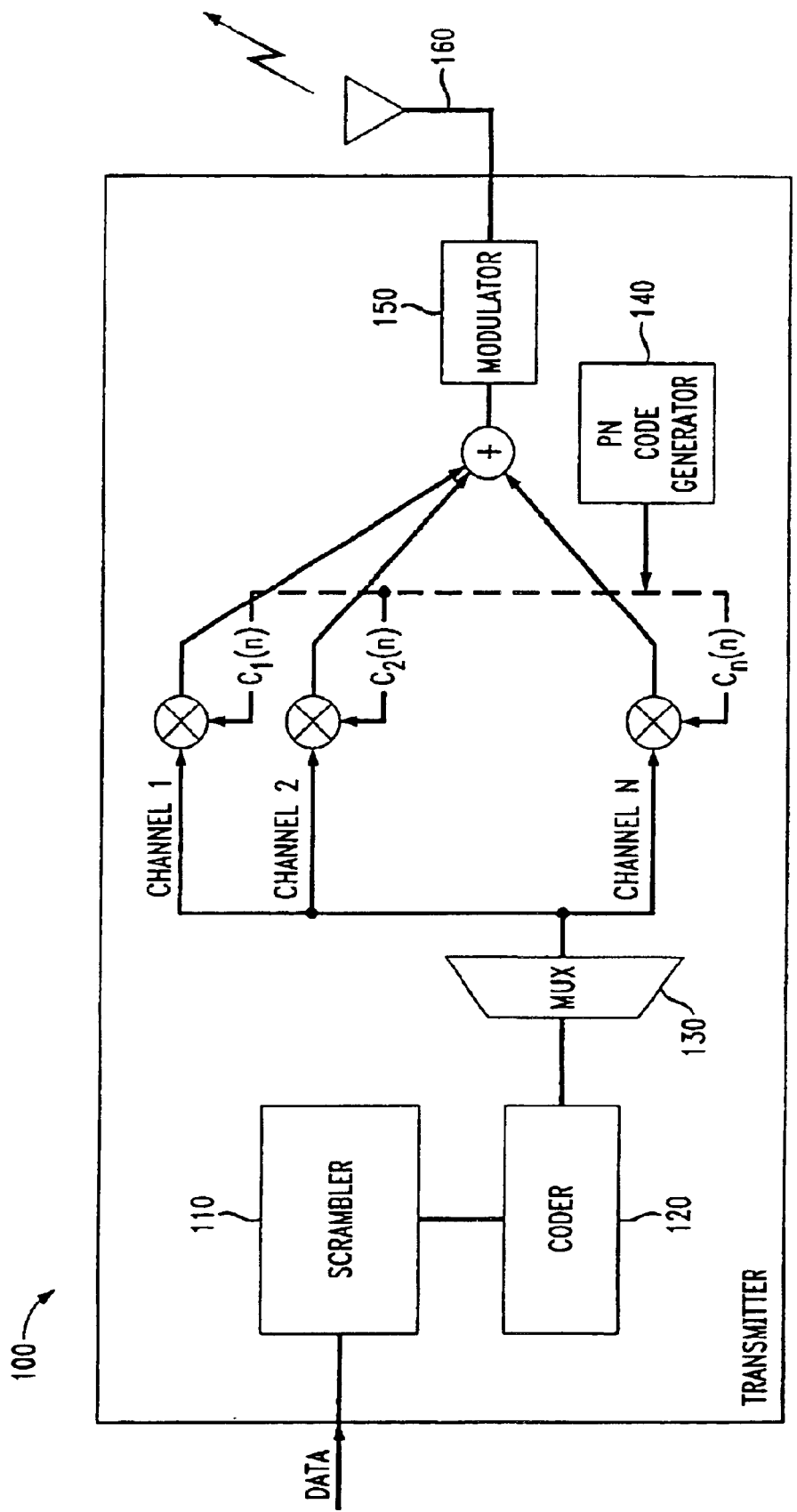
FIG. 1 is a schematic block diagram of a transmitter according to first exemplary embodiment of the present invention.

Referring to FIG. 1, there is shown a transmitter 100 (e.g., transmitting cellular phone) for use in a wireless communications system, such as a Code Division Multiple Access (CDMA) system. The transmitter 100 includes, for example, a scrambler 110, a string-based framing coder 120 (described in detail below), a multiplexer 130, a pseudorandom noise (PN) code generator 140, a modulator 150 and a transmission antenna 160. As shown in FIG. 1, data (e.g., in the form of bits, bytes, etc. of data) which is to be transmitted over the wireless communications system enters the transmitter at a specified rate (e.g., 28.8 Kilobits per second (Kbps)). The data preferably comprises a plurality of information bit strings as will be understood by those skilled in the art.

For clarity of explanation, the following description refers to transmitting data in the form of binary information elements or information bit strings. In other words, the term "information bit string" is used, although those of skill in the art will understand that symbols other than binary one's and zero's can also be used in accordance with the present invention. For example, a three-level information symbol may also be used and benefit from the deskewing concepts described herein. All of the information bit strings may have a same number of bits in some embodiments to simplify the system implementation. In other embodiments, the bit strings could have different lengths as would be appreciated by those skilled in the art.

The data is first routed to a scrambler 110 which scrambles the data as is well known in the art. Preferably, the scrambler 110 is connected upstream from the string-based framing coder 120. The scrambler 110 may be desirable to avoid long strings of null values which could hinder data recovery as will be appreciated by those skilled in the art. In other embodiments, the scrambler 110 may be connected downstream from the string-based framing coder 120. Such an optional scrambler may be a self-synchronizing scrambler, as will be appreciated by those skilled in the art.

After the data has been routed to the scrambler 110, the scrambled data is routed to a string-based framing coder 120 which appends (e.g. adds) a framing code to the data. The string-based framing coder 120 determines and appends a string-based framing code to each information bit string of information bit strings to be transmitted. "Appending" is meant to cover both prepending (i.e, adding the code before the data) and postpending (i.e, adding the code after the data), although those skilled in the art will recognize that postpending may be preferred, since prepending may require more buffer memory. The appended framing code is used in a receiver 200 (See FIG. 2) to deskew or 'line up' the transmitted data so that it makes logical sense to the recipient.

Once the data has been coded by the string-based framing coder 120, the data is routed through a multiplexer 130 to pseudorandom noise (PN) code generator 140. As is well known in the art, the PN code generator is a necessary part of any CDMA telecommunications system. The PN code is used to 'spread' a data signal (e.g., the information bit strings) over a larger bandwidth for transmission. The multiplexer 130 separates each information bit string of the data onto a separate transmission channel. Channels "1" through "n" are shown in FIG. 1 (labeled "Channel 1" through "Channel n"). The number of transmission channels, and consequently the number of outputs of the multiplexer 130, corresponds directly to the number of PN codes utilized in the transmitter 100. The number of outputs of the multiplexer 130 and thus, the number of PN codes and transmission channels may be selected based on the particular requirements of the transmitter 100 (and receiver 200). For example, if the transmitter 100 is intended to transmit large volumes of data, the number of transmission channels and PN codes should be large to accommodate the data. The PN code generator 140 multiplies (convolves) each information bit string (carried in each separate channel) by a different PN code (i.e., codes $C_1(n)$ to $C_n(n)$) to 'spread' the bandwidth of the information. The separate coded information bit strings are then added together, and the twice-coded bit strings are passed on to a modulator 150. As is well known in the art, the modulator 150 provides a modulation signal which is combined with the bit strings so that the bit strings may be transmitted.

The PN codes are assigned to the data streams based on a request process. In normal operation, the transmitter may have ten (10) transmission channels assigned thereto for transmitting data. One of the advantages of the present invention is that the transmitter may request additional transmission channels based on need. For instance, if the transmitter 100 must transmit a large volume of data, it may request ten (10) additional PN codes (corresponding to 10 additional transmission channels). The PN code assignment procedure may be performed based on a specified protocol. One exemplary protocol is as follows:

1.) Transmitter 100 (e.g., transmitting cellular phone) requests additional "n" PN codes.

2.) Base station (e.g., cellular provider) either grants requests and assigns additional PN codes, or rejects request and provides "N-A" PN code (preferably to the transmitter 100).

3.) a.) If transmitter request is granted, base station sets to receive information on those assigned PN codes from each transmitter.

b.) If transmitter request is denied, base station returns to "normal mode" (explained below).

c.) If transmitter request is denied, but a "counter-offer" is made (e.g., base station transmits that it can offer five (5) channels, but not ten (10)), the base station will go into "negotiation mode" (explained below) with the transmitter.

4.) If base station accepts the transmitter PN code request, the transmitter immediately starts to transmit information. If base station has made a "counter-offer", the base station and the transmitter go into "negotiation mode" until a certain number of channels are agreed upon, and then the transmitter begins to transmit information. If the base station rejects the transmitter request, the transmitter may request the PN code(s) again later.

5.) The PN code(s) granted by the base station will 'time out' (i.e., expire) after a predetermined time. To accomplish this, the transmitter may send a 'PN code release' signal (e.g., in the form of a bit string appended to the end of the data) to the base station after the transmit operation is completed.

6.) Once the PN code(s) have been released, they are available again for request from the same or another transmitter.

Each transmitter 100 may support "n" PN codes as discussed above. Accordingly, if one PN code allows an "x" bit rate, then the maximum bit rate capability of the transmitter 100 will be:

Maximum Bit Rate=n*x, where n=the number of transmission channels and x=the bit rate per channel.

In "normal mode", the transmitter 100 will operate at "x" bit rate. The transmitter operates in "normal mode" at all times when the transmitter is not requesting additional bandwidth (transmission channels). During a transmission, the transmitter 100 may require additional bandwidth, which may be requested using the request procedure outlined above. As discussed above, each PN code defines a separate transmission channel. Therefore, information to be transmitted from the transmitter 100 to the base station (and onto the receiver 200) or vice versa should be parallelized on the transmit side. This parallelization is accomplished in the present invention by mutliplexer 130.

The "negotiation mode" of the transmitter and the base station is mode during which the transmitter and the base station find an appropriate number of channels to transmit information. The "negotiation mode" will typically only be activated when the requested number of additional transmission channels is close to the number of transmission channels which the base station has available (e.g., within five (5) channels). For example, if the transmitter requests ten (10) additional transmission channels, but the base station only has seven (7) available, the transmitter and the base station will come to agreement on the 7 channels in "negotiation mode." The negotiation may be accomplished in many ways, one exemplary method would be for the transmitter to successively lower its request by one transmission channel and re-send the request to the base station. This procedure would continue until the number of available transmission channels is reached, and then the transmitter would transmit information as described above.

Figure 2:
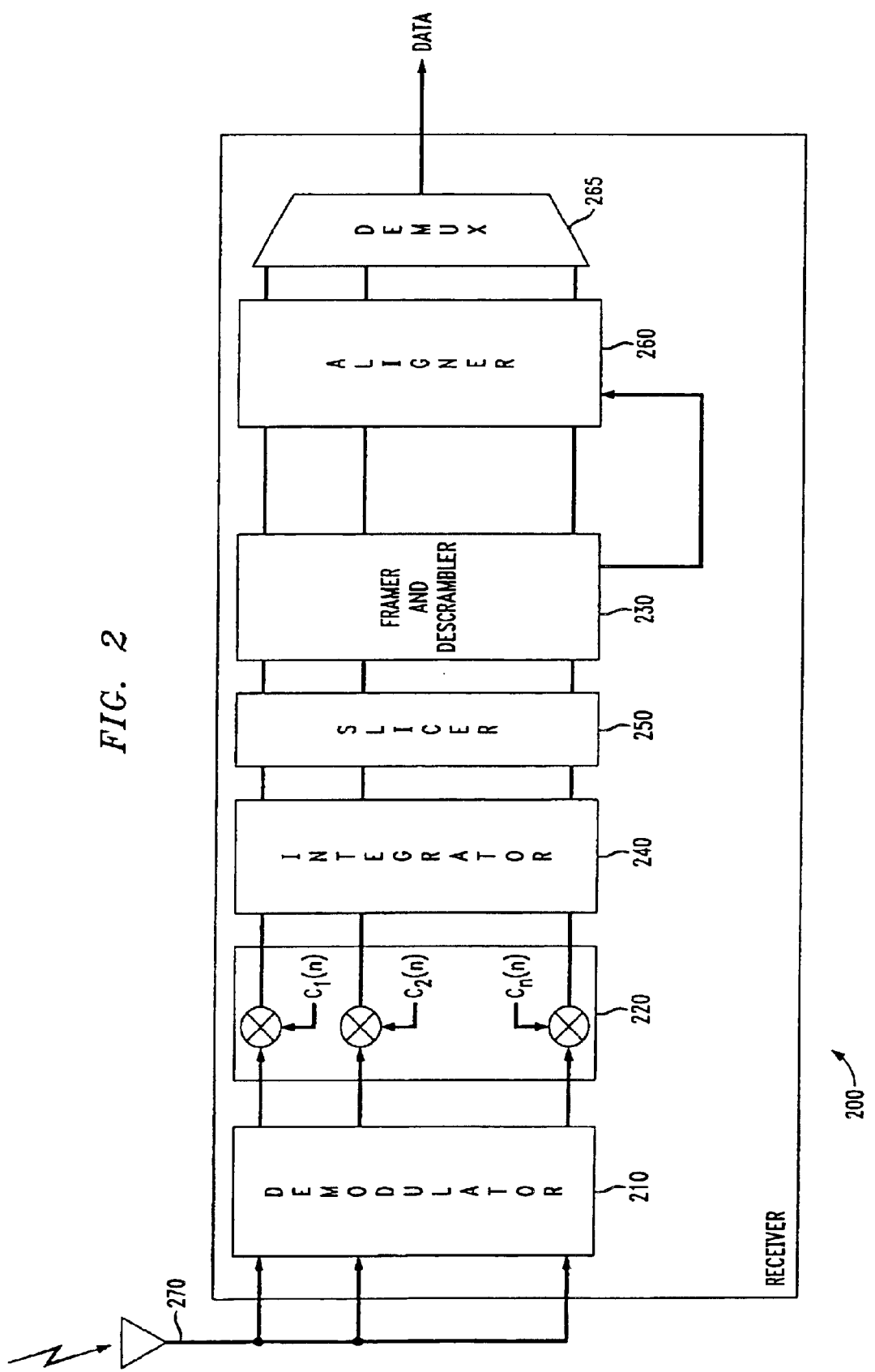
FIG. 2 is a schematic block diagram of a receiver according to first exemplary embodiment of the present invention.

Referring to FIG. 2, there is shown a receiver 200 (e.g., receiving cellular phone) for use in conjunction with the transmitter 100 in the wireless communications system. The receiver 200 includes, for example, a demodulator 210, a pseudorandom noise code generator 220, a framer and descrambler 230, an integrator 240, a data slicer 250, an aligner 260, a demultiplexer 265, and a reception antenna 270.

Data (e.g., information bit strings) transmitted by the transmitter 100 and received by the reception antenna 270 are first routed to a demodulator 210 which removes the modulation signal from the data as is well known in the art. The demodulator 210 (as well as the other devices leading up to the demultiplexer 265) has a plurality of inputs and outputs corresponding to the number of transmission channels generated by the transmitter. The data is then transmitted to a PN code generator 220 which operates in conjunction with the integrator 240 to recover the data from the mixed pseudorandom noise (PN) and data signal as is well known in the art. The framer and descrambler 230 descrambles the data and recovers the data based on the string-based framing code, as explained below.

The descrambled and framed data is then applied to the data slicer 250. The data slicer 250 basically comprises a circuit that compares an input signal voltage a predetermined level. If the input signal voltage is above the threshold voltage, it is assigned one of the two logic levels (e.g., "1"). If it is below the threshold, it is assigned the other logic level (e.g., "0").

The data is then aligned by the aligner 260 so that the data appears in the same sequence in which it was sent (explained in detail below). Finally, the data is demultiplexed by demultiplexer 265 so that it appears as one continuous stream of data to the receiver. Although only one receiver 200 and one reception antenna 270 are shown in FIG. 2, it should be noted that the present invention may be utilized with multi-antenna receivers (receivers with an antenna array), or with multiple receivers (each having at least one antenna).

Figure 3:
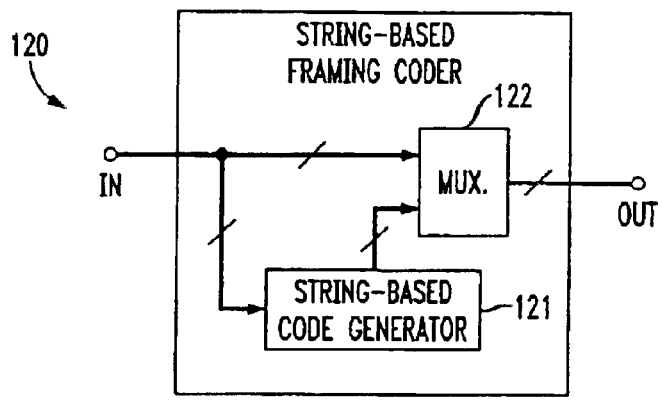
FIG. 3 is a schematic block diagram of a coder according to first exemplary embodiment of the present invention.

FIG. 3 shows the details of the string-based framing coder 120 of the transmitter 100. As shown, the coder 120 preferably includes a string-based code generator 121 for generating each string-based framing code based upon at least some of the information bits in the respective information bit string. A multiplexer 122 appends the string-based codes to the respective information bit strings as will be appreciated by those skilled in the art.

In one preferred embodiment, the string-based coder 120 comprises a cyclic redundancy checking (CRC) coder for determining and appending CRC codes to respective information bit strings. Thus, the framer and descrambler 230 of the receiver 200 may comprise a CRC framer for framing the information bit strings based upon the CRC codes. Each CRC code may be one of a CRC-4 to CRC-32 code, for example. For an information bit string of 1024 bits, for example, a CRC-8 code may be sufficient to ensure quick and accurate framing.

The string-based code may also include other bits in addition to those specifically based on the information bit string, such as the CRC code bits, for example. Some bits may be assigned as counting or identifying bits to be used when the expected delay or skew was greater than a single frame as will be appreciated by those skilled in the art. Of course, other bits could be assigned for other purposes as well.

A particular advantage of the CRC coding is that a straightforward hardware implementation can be achieved with a relatively small number of logic gates as will be appreciated by those skilled in the art. CRC codes are also resistant to false framing while adding relatively little overhead to the information bit strings. Fixed framing in contrast, would likely experience considerable false framing for a similar number of code bits. If the number of fixed framing bits were increased to reduce false framing, the overhead may be considerable. Yet another advantage of CRC codes is that they may also be used for error detection and correction as they are conventionally used.

Figure 4:
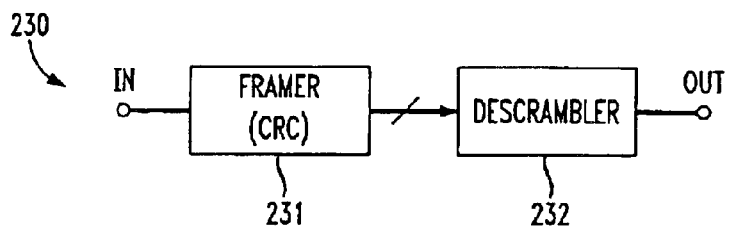
FIG. 4 is a schematic block diagram of a framer and descrambler according to first exemplary embodiment of the present invention.

FIG. 4 shows the details of the framer and descrambler 230 of the receiver 200. As shown, the framer and descrambler 230 preferably comprises a framer 231 for framing information bit strings based upon the respective string-based framing codes. The framer and descrambler 230 also illustratively includes a descrambler 232 for descrambling the information bit strings. The descrambler 232 is preferably coupled to the framer 231 and the aligner 260. Of course, in some embodiments, the descrambler 232 (and the scrambler 110) may not be needed at all.

The framer 231 operates bit by bit, as is well known in the art, comparing CRC codes generated at the receiver with the last "n" bits ("n" representing the size of the CRC code, e.g. CRC-8, n=8) of the incoming data signal (bit stream). When there is a match, a 'potential' frame location is identified. After finding a 'potential' frame location, the next frame position is known (by virtue of the fixed frame length, or by information contained in the previous frame), and if the next CRC code is correct, confidence is increased that framing is correct. If this next CRC code is incorrect, the framing search continues. This process continues until the desired confidence is achieved, at which point framing synchronization is declared (See FIG. 9).

Figure 5:
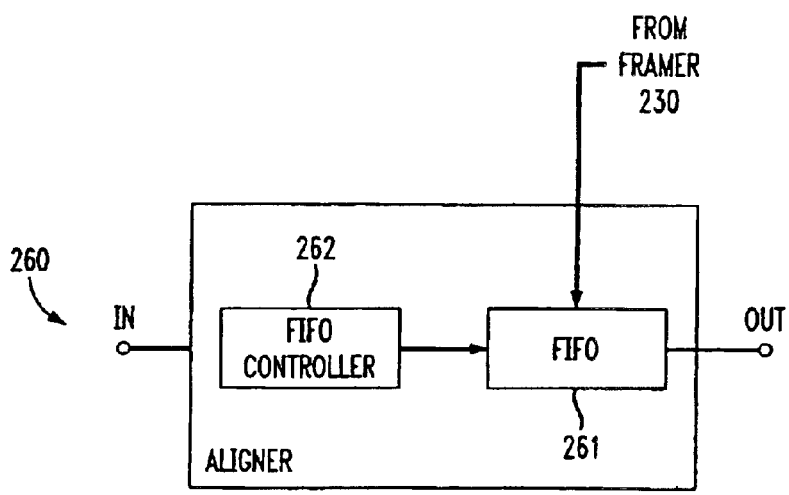
FIG. 5 is a schematic block diagram of an aligner according to first exemplary embodiment of the present invention.

FIG. 5 shows the details of the aligner 260 of the receiver 200. The aligner 260 aligns framed information bit strings relative to one another and based upon the string-based framing codes. The aligner 260 may, in turn, advantageously comprise at least one First-In-First-Out (FIFO) device 261 connected to the framer 230 for buffering framed information bit strings. The aligner 260 also illustratively includes a FIFO controller 262 for aligning framed information bit strings during at least one of a writing and a reading phase of the at least one FIFO device and based upon the string-based framing codes. The term "FIFO device" is used herein to include a FIFO, a shift register, and any other type of ordered storage element as will be appreciated by those skilled in the art.

The aligner 260 operates by looking for where the CRC code occurs, in each and every bit stream, after framing synchronization has been declared by the framer 231 (as described above). Because the bits streams are formed in parallel at the transmitter 100, they are automatically aligned when they are transmitted. The skew is created when the parallel bit streams are propagated from the transmitter 100 to the receiver 200. Thus, if the receiver 200 determines where any CRC code or codes are located, the receiver can successfully align across every bit stream.

The alignment is performed via First-In-First-Out (FIFO) memory structures, which are well known in the art. One implementation of a FIFO involves a memory in which data (bit streams) can be written to and read from. Bit streams which arrive at the receiver 200 are written to sequential locations in the FIFO memory, with addresses provided by a counter that may be referred to as a "write" pointer. A corresponding counter, which may be referred to as the "read" pointer provides addresses for reading from the memory. Additional logic ensures that the "read" pointer always references memory locations 'behind' the "write" pointer, so that the net effect is to implement a queue.

Figure 6:
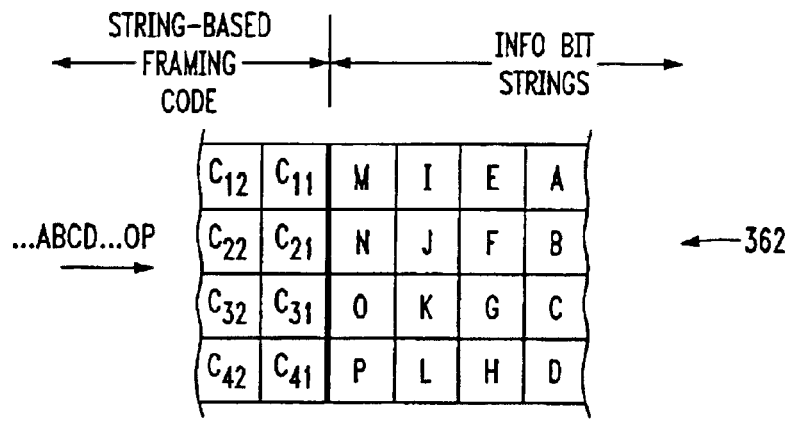
FIG. 6 is a schematic bit position diagram.
Figure 7:
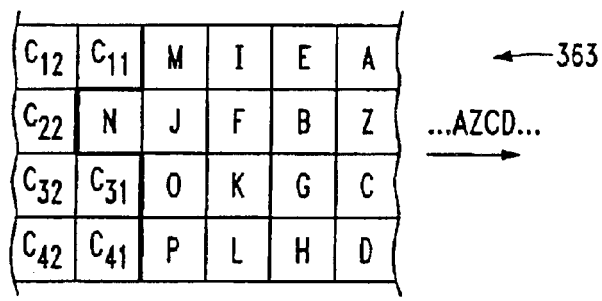
FIG. 7 is a schematic bit position diagram illustrating skew.
Figure 8:
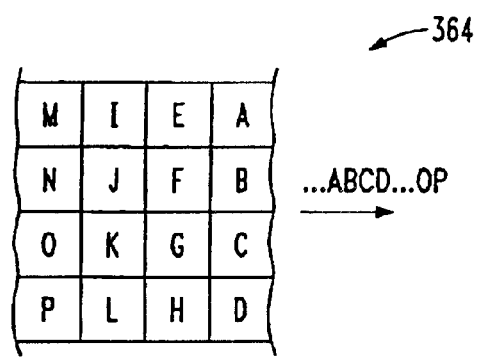
FIG. 8 is a schematic bit position diagram illustrating deskewing.

Referring now more particularly to FIGS. 6–8, the deskewing in accordance with the invention is described with reference to a simplified example. Table 362 in FIG. 6 illustrates the alignment of some of the information bit strings A-P and some of the CRC bits $C_{11}$–$C_{42}$ (generated by the coder 120). This is the proper alignment that should be produced at the output of the receiver 200 (i.e., data bits read A, B, C, D, etc.).

As shown in Table 363 of FIG. 7, the second information bit string from the top is out of alignment with the other information bit strings (i.e., it is delayed with respect to the other information bit strings). The misalignment of the second bit string may be caused by, for example, the difference in time delay between the different channels of a CDMA telecommunications system (such as the one described above). Accordingly, if the information bit string were recovered without deskewing, the data would be A, Z, C, . . . P. In other words, the information bit string would be incorrect.

Now, as shown in the table 364 of FIG. 8, the deskewing of the present invention re-aligns the frames that may have been misaligned due to skew. Accordingly, the correct information bit string, A, B, . . . P, is produced at the output.

The communications system and associated deskewing method using the string-based framing codes advantageously and efficiently removes or accounts for the skew. This permits higher bit rates and/or longer transmission distances. The higher bit rates may permit a reduction of pin count for communication between integrated circuit chips. As the cost for additional pins and packaging complexity may be relatively high, the present invention also permits lower cost communications ICs having an aggregate communication rate that is still relatively high as will be appreciated by those skilled in the art.

Figure 9:
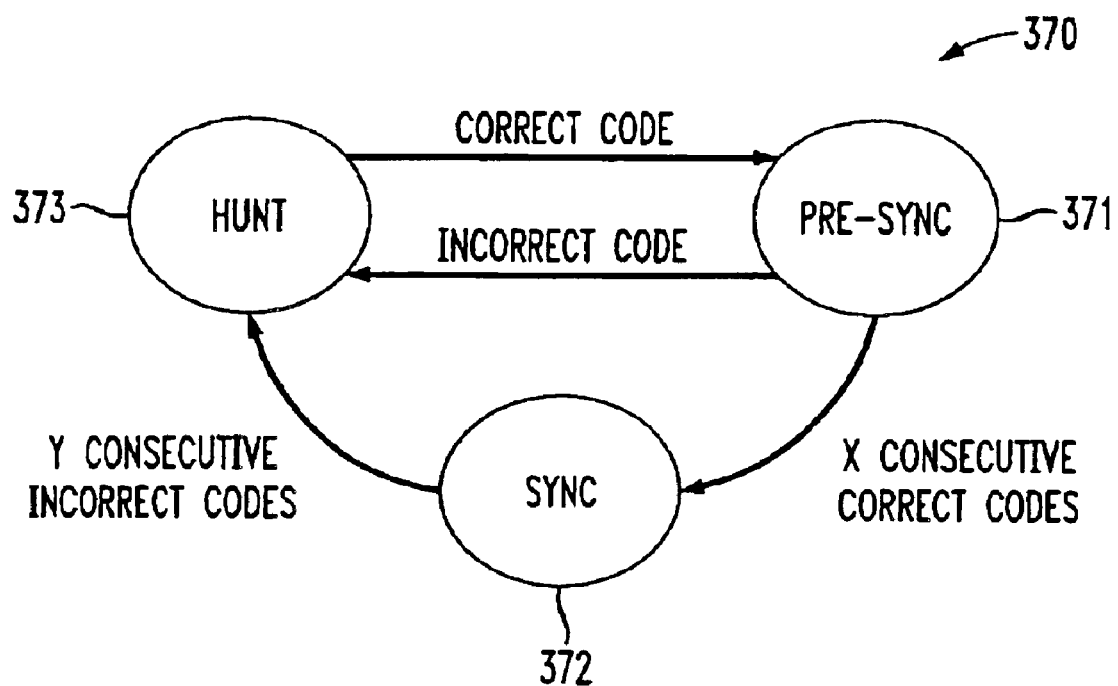
FIG. 9 is a schematic diagram of a framing state machine.

Referring now more particularly to FIG. 9, some additional framing or synchronization concepts are now explained. In particular, the illustrated state framing machine 370 has three states: a pre-sync state 371, a hunt state 373 and a sync state 372. Transition between the hunt and pre-sync states is determined based upon a correct or incorrect string-based framing code. The machine 370 changes from the pre-sync state 371 to the sync state 372 if X consecutive correct codes are determined. The machine 370 transitions from the sync state 372 to the hunt state 373 if there are Y consecutive incorrect codes determined. The state framing machine 370 is very similar to state framing machines used in other known data synchronizing applications as will be appreciated by those skilled in the art.

An example of a framing scheme is described below. At 622 MegaBits per second (MBps) and above, controlling skew can be difficult. To ensure alignment between bits, and accomplish framing, each bit has its own framing structure: for every n information bits transmitted, there is a CRC appended. The n information bits, along with the CRC may be referred to as an information frame. The preferred size of n is 1024 bits, and the suggested CRC is a CRC-8 of polynomial $x^8+x^2+x+1$. However, this size and CRC can be varied dependent on an analysis to determine maximal probabilistic acquisition times. Other suggested sizes are n=512 bits with a CRC-4 or n=2048 bits with a CRC-32. The CRC-4 requires the least hardware, but may require considerable acquisition time because of high false framing probabilities. The CRC-32 requires more framing circuitry.

In addition to the appended CRC, the data may also be scrambled using a frame synchronous scrambler (e.g., scrambler 110 in FIG. 1) of sequence length 127, of polynomial $x^7+x^6+1$. The scrambler shall be reset on the most significant bit of the byte following the CRC insertion. Note that the scrambling of information is performed to ensure a uniform distribution of 0's and 1's.

As will also be appreciated by those skilled in the art, although the above description is concerned with a CDMA communication system, the teachings of the present invention may be applied to other communication systems such as Dense Wave Division Multiplexing (DWDM), Time Division Multiple Access (TDMA), and any other equivalent communication systems known to those skilled in the art. Additionally, although the above CDMA system utilizes a pseudorandom code generator, it is within the scope of the invention to use a random code generator or any other equivalent code generator. Furthermore, although the above description relates to a wireless telecommunications system, it should be noted that the principles of the present invention may be applied to a wired telecommunications system. Finally, although the above description discusses the transmitter 100 and receiver 200 as being separate elements, a transceiver (such as those present in cellular phones) may also be utilized without departing from the principles of the present invention.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A method for communicating wireless telecommunications signals between a transmitter and a receiver via a base station, comprising the steps of:

requesting from a base station a specified number of additional requested codes corresponding to additional communication channels spread over a corresponding increased bandwidth; and, granting or denying the request based on the number of codes available.

2. The method of claim 1, comprising the further step of:

transmitting data from the transmitter to the receiver using the additional communication channels spread over a corresponding increased bandwidth.

3. The method of claim 1, wherein the step of granting or denying the request further comprises:

transmitting a counter offer of additional codes corresponding to additional channels spread over another bandwidth that differs from said corresponding increased bandwidth, said counter offer of additional codes being less then the number of requested codes.

4. The method of claim 2, comprising the further step of:

relinquishing the requested codes corresponding to the additional communication channels once the data has been transmitted from the transmitter to the receiver.

5. The method of claim 4, wherein the step of relinquishing the requested codes comprises:

transmitting a relinquish signal to the base station.

6. The method of claim 1, wherein the requested codes and the additional codes comprise pseudorandom noise codes.

7. The method of claim 1, wherein each of the requested codes corresponds to a separate communication channel of increased bandwidth for transmitting information from the transmitter to the receiver via the base station.

* * * * *